United States Patent [19]

Berz

[11] 4,406,672
[45] Sep. 27, 1983

[54] PROCESS AND INSTALLATION FOR THE INTERMITTENT CLEANING OF DUST-LADEN CRUDE GASES

[75] Inventor: Wolfgang Berz, St. Moritz, Switzerland

[73] Assignee: Gimag Aktiengesellschaft, Switzerland

[21] Appl. No.: 242,082

[22] Filed: Mar. 9, 1981

[30] Foreign Application Priority Data

Mar. 11, 1980 [CH] Switzerland ............ 1904/80

[51] Int. Cl.³ .................................. B03C 3/00
[52] U.S. Cl. .................................. 55/6; 55/99;
  55/131; 55/133; 55/136; 55/474; 55/479;
  55/150
[58] Field of Search ............. 55/131, 6, 99, 124–126,
  55/136, 479, 474, 154, 133, 150

[56] References Cited

U.S. PATENT DOCUMENTS

| 4,142,873 | 3/1979 | Berz | 55/12 |
|---|---|---|---|
| 4,203,736 | 5/1980 | Berz | 55/479 |
| 4,220,478 | 9/1980 | Schuff | 55/99 |
| 4,295,867 | 10/1981 | Shopin et al. | 55/98 |
| 4,308,036 | 12/1981 | Zahedi et al. | 55/6 |

FOREIGN PATENT DOCUMENTS

| 539327 | 6/1932 | Fed. Rep. of Germany | 55/133 |
|---|---|---|---|
| 2842718 | 4/1979 | Fed. Rep. of Germany | 55/131 |
| 2942223 | 5/1980 | Fed. Rep. of Germany | . |
| 96717 | 9/1939 | Sweden | 55/107 |
| 2036604A | 7/1980 | United Kingdom | 55/131 |

*Primary Examiner*—Bernard Nozick
*Attorney, Agent, or Firm*—Neil F. Markva

[57] ABSTRACT

An intermittently operated apparatus for cleaning dust laden gases has a gas-tight housing, a pair of spaced gas-permeable walls holding a filter bed consisting of granular filter material. A centrally located conveying pipe is mounted to the housing for regenerating the filter bed after a predetermined amount of operating time. A high electric potential is applied in the region of the filter bed for removing dust particles from the dust laden gas which is flowing through the permeable walls and the filter bed. From time to time, the gas cleaning mode is interrupted and the granular filter material of the filter bed is regenerated by fluidizing the same in the conveying pipe. A system comprising a plurality of such filtering apparatus always maintains one of the apparatus in a regenerating mode while the remaining filter devices are in gas cleaning mode. Thus, the simultaneous operation of cleaning and regenerating is accomplished. The use of a filter bed having a thickness of about 25 to 100 mm. and consisting of granular filter material having a grain size of about 0.5 to 2.0 mm. in combination with application of high electric potential charge of about 10,000 to 60,000 volts achieves significant improvement over prior apparatus and methods.

31 Claims, 9 Drawing Figures

RESIDUAL DUST CONTENT OF FILTERED IN mg/Nm³

4,406,672

PROCESS AND INSTALLATION FOR THE INTERMITTENT CLEANING OF DUST-LADEN CRUDE GASES

FIELD OF THE INVENTION

The present invention relates to a process for the intermittent cleaning of dust laden crude gases and the apparatus for carrying out such process. Particularly, the present invention relates to a filter device having a filter bed of granular filter material disposed between two spaced, gas-permeable walls and to the application of an electrical potential charge in the region of the filter bed.

BACKGROUND OF THE INVENTION

It is known, according to German Pat. No. 2,942,223, to direct dust-laden crude gases to a filter bed consisting of coarse granular filter material having an average diameter of approximately 10 mm., located between two spaced, gas-permeable walls. In this system, bars of an electrically conducting material are located inside the filter bed. The filter bed continuously travels downward through the device and is taken out of the system for cleaning purposes. The filter bed has a thickness of 600 mm and the electrically conducting bars are connected to an electrical potential of a maximum of 50,000 volts.

The dust separation inside the filter bed is to some extent improved by the array of electrically conducting bars. However, during operation of this known system, it becomes apparent that certain disadvantages must be accepted. These disadvantages can be summarized as follows.

(1) During operation, the granular filter material continuously moves downwardly and is discharged to the outside of the system and returned to the filter bed from above, after cleaning. An elaborate cleaning unit, for example, cloth tube filters and the associated conveying devices are required. These requirements make the complete system considerably more expensive.

(2) Since the electrically conducting elements are arrayed in the mass of filter bed and the transfer of current must not take place from one of the gas-permeable walls to the electrically conducting elements, the distance of these elements from the two gas-permeable walls must be greater than the sparkover distance corresponding to the high potential being applied to the filter bed. Under most circumstances, the thickness of the filter bed must correspond to at least twice the sparkover distance. Such increase in the thickness of the filter bed requires enormous quantities of granular filter material. In a typical industrial filter having a height of approximately 10 meters, this would amount to 150 tons of granulated filter material which must be circulated and cleaned once every 4 hours.

(3) The coarse-grained granular filter material of the filter bed of the prior art allows the dust contained in the dust laden crude gas to penetrate to a greater depth into the filter bed. This requires a filter bed thickness of approximately 600 mm. for a satisfactory dust removal.

(4) Dust laden crude gas flows transversely through the granular filter material which is moving downwardly and is continuously being replenished, from above, by a new clean granular filter material. Accordingly, the lowest portion of the filter bed is always the most heavily contaminated thereby causing this portion to be electrically conductive. This conductivity causes a continuous flow of an electric current in this lower region. Obviously, operating expenditure is considerably increased. Furthermore, in this type of arrangement, a higher quantity of gas moves through the upper region of the filter bed while undergoing a lower degree of cleaning. The efficiency of the system for the cleaning of the dust laden crude gas increases in the downward direction in accordance with the increased contamination of the filter bed. Although excellent dust separation could be possible in the lower section of the filter bed, the amount of gas effectively passing through the section is very low, virtually equal to zero, due to a heavy contamination.

In this known system, the choice is either to depart considerably from the optimum operating conditions or, for the sake of safety, to increase the layer thickness to an extreme degree. However, this presents further disadvantages.

(5) In consideration of the large mass of the granular filter material and its correspondingly high heat-absorption capacity, the filter material must normally be preheated before entering the filter bed. This is to reduce undesired condensation to a permissible amount. Condensation causes the baking together of the dust particles and the formation of dust cakes, known as moon pies, which are impermeable to gas. The expenditure of energy associated with this warming-up process is considerable. Condensation is virtually unavoidable during this process and leads to sparkovers of the high potential.

PURPOSE OF THE INVENTION

The main object of the present invention is to provide a process and an assembly for cleaning dust laden crude gases which avoid the above-mentioned disadvantages of the known systems.

Another object of the present invention is to provide a system having a possible clean gas output of 100% with an optimum degree of cleaning.

Another object of the present invention is to provide a process and an assembly having no external cleaning devices for the granular filter material while using a fraction of the granular filter material required in the prior art system.

A further object of the present invention is to prevent the leakage of the current in the filter bed so that total expenditure of energy for the system is kept at a minimum.

The combination of electrostatic charging and intermittent regeneration is implemented which results in a high degree of cleaning accompanied by low system costs and low expenditure of operating energy. Moreover, virtually 100% filtering is always guaranteed.

SUMMARY OF THE INVENTION

The cleaning process of the invention is carried out in such a manner that incidents involving the passage of current are virtually excluded while it is nevertheless possible to employ an exceptionally thin filter bed and a correspondingly small mass of filter material which has to be circulated. The filter material is completely cleaned for each operating phase, such a phase having a duration of approximately 30–60 minutes. Quartz sand ($SiO_2$) is preferably used as the granular filter material and once cleaned, it becomes a perfect insulator.

The process of the invention comprises the steps of providing a filter bed unit within a gas-tight housing and including a filter bed of granular filter material located between two gas permeable walls which are spaced apart with respect to each other. The filter bed has a thickness d of between 25 and 100 mm. and the granular filter material has an average grain size of between 0.5 and 2.0 mm. An electrical potential of between 10,000 and 60,000 volts is applied in the region of the filter bed while introducing dust laden crude gases through the filter material which remain stationary in the filter bed during a crude gas cleaning mode. After a predetermined time, the electrical potential is switched off and the granular filter material is circulated within the filter bed during a regenerating mode to completely clean the filter material within the filter bed unit.

Another feature of the process is effected through the use of a plurality of filter bed units which are connected in parallel with respect to each other. At any given time, at least one of the filter bed units is maintained in a regenerating mode while the remaining filter bed units are operating in the crude gas cleaning mode. Thus, it is possible to maintain an optimum cleaning potential throughout the overall plurality of filter beds.

An apparatus made in accordance with this invention includes a gas-tight housing having an inlet for directing dust laden crude gases into a crude gas region and an outlet for discharging clean gas from a clean gas region. Two gas permeable walls are laterally spaced a distance of about 25 to 100 mm with respect to each other within the gas-tight housing. The spacing between the two spaced gas-permeable walls is effective to contain a stationary filter bed consisting of granular filter material. Gas conveying means is mounted to the gas-tight housing for intermittently directing cleaning gas through the housing to regenerate the granular filter material while the filter material remains within the housing. Discharging means is effective to direct dust particles clean from the dust laden crude gases out of the gas tight housing. The apparatus is electrically wired to provide a means for intermittently applying an electrical potential of about 10,000 to 60,000 volts to the region of the filter bed while dust laden crude gases are directed into the crude gas region. A granular filter material having an average grain size of from about 0.5 to 2 mm. is disposed within the spacing to form the filter bed between the spaced gas-permeable walls.

Another feature of the invention is the use of a plurality of apparatus wherein each apparatus is connected in parallel relationship with respect to the next apparatus. Control means is effective (1) for directing a flow of crude gas through the filter bed of each apparatus, (2) for interrupting the flow of crude gas, (3) for introducing a flow of scavenging gas while the flow of crude gas is interrupted, and (4) for switching off the electrical potential while the flow of scavenging gas is being introduced. Means are provided for circulating the granular circular material in at least one of the plurality of apparatus at any given time to effect regeneration while the electrical potential is switched off. Control means and circulating means are effective to renew, periodically, the granular filter material in its entirety in said at least one of the plurality of apparatus while the granular filter material and the remaining apparatus remain undisturbed.

DETAILED DESCRIPTION

Figure 1:
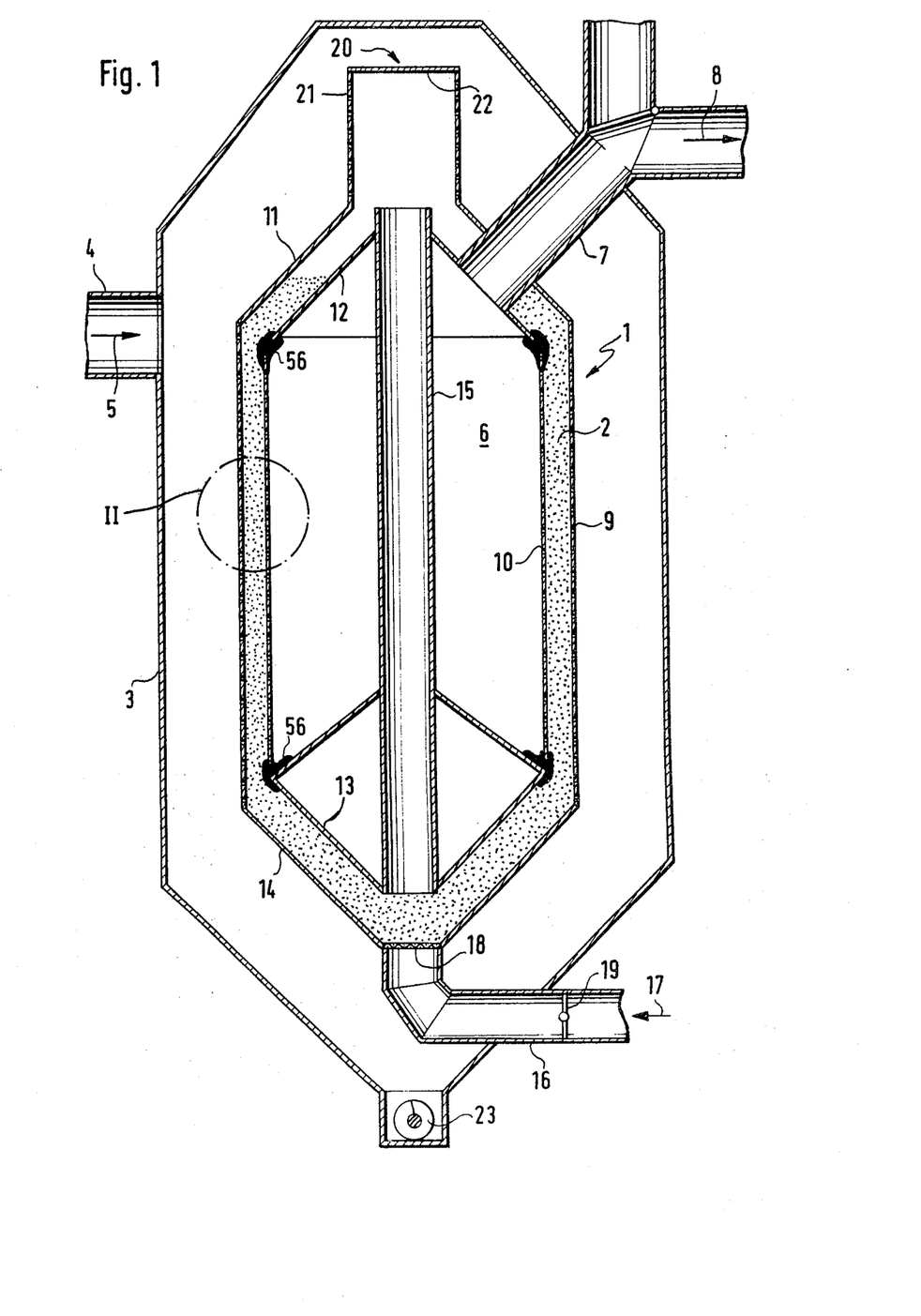
FIG. 1 is a sectional view of an apparatus made in accordance with this invention during the gas cleaning mode.

FIG. 1 shows, in a diagrammatic representation, a filter device of the present invention in the operating phase. This device has a filter element 1 containing the filter bed 2 which consists of granular filter materials. The filter element 1 is located in a gas-tight, crude gas housing 3. The dust laden gas or otherwise contaminated crude gas is introduced into the gas housing 3, via a pipe 4, as indicated by an arrow 5. The crude gas travels through the filter bed 2 and a clean gas chamber 6, formed in the interior of the filter unit or element 1. Clean gas leaves via a line 7 which opens into the clean gas chamber 6. The flow of the clean gas is shown by an arrow 8.

The filter bed is contained between two spaced gas-permeable walls 9 and 10 which are coaxially disposed with respect to each other and form a cylindrical section or tube. The walls 9 and 10 are closed at their two axial ends by conical members or caps 11, 12 and 13, 14 which taper toward the outside. The caps 11, 12 or 13, 14 respectively located at the same axial end, are spaced apart from one another and the granular filter material extends into the inner space formed between the caps to a length which is sufficient to seal off the clean gas chamber 6 from the crude gas chamber 3.

A conveying pipe 15 is located in the interior of the filter unit or element 1. Pipe 15 is coaxial with the gas permeable tubes 9, 10 and opens into the cone members 12 and 13. During the regenerating mode or phase of the filter bed, pipe 15 is used for conveying the granular filter material from the lower side of filter bed 2 to the upper side of bed 2. In doing so, pipe 15 acts as a thin-flow conveyor to which conveying air is fed in the direction of an arrow 17 via a line 16. Line 16 opens to the cap 14 and is in fluid communication with one end of conveying pipe 15. Line 16 is separated from filter bed 2 by a gas-permeable wall element 18, for example a grating, which prevents the granular filter material from penetrating into line 16. In addition, a valve 19, for example a flap valve, is located in the path of the conveying air for controlling the flow of air. Valve 19 remains closed during the operating or gas-cleaning mode (FIG. 1), while being open during the regenerating mode. A hood 20 is mounted, coaxially to the conveying pipe 15, on the outer upper cap 11. Hood 20 has a curved cylindrical surface formed by a gas-permeable wall element 21. The end of the hood 20 facing axially away from the conveying pipe 15 is closed by a plate 22 which is impermeable to a gas.

When the filter unit is in the gas cleaning mode, crude gas flows in the direction of the arrow 5 into the crude gas chamber or region of housing 3 and through the filter bed 2. Filter bed 2 traps the dust present in the crude gas. Some of the dust is also retained on the external surface of the wall 9, falls to the bottom and is discharged by a conveyor 23. Further details of this installation can be obtained from Swiss Patent Application No. 614,128 which corresponds to U.S. Pat. No. 4,142,873.

Figure 2:
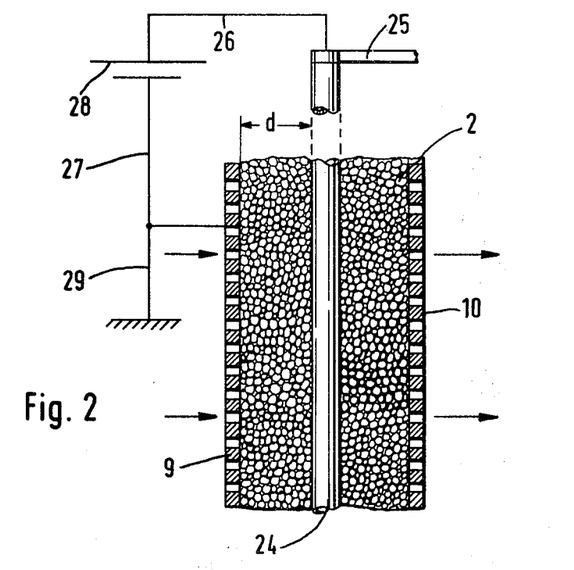
FIG. 2 is a fragmentary sectional view of the portion marked II in FIG. 1.

According to the diagrammatic sectional illustration shown in FIG. 2, a plurality of metal bars 24 extend into the filter bed 2 in the inner space between the two gas-permeable walls 9 and 10. Bars 24 are distributed, spaced with respect to each other, in filter bed 2 and accordingly are located on the curved surface of an imaginary cylinder of a circular section. All of the metal bars 24 are connected together, at their upper part, by metal ring 25. If preferred, the lower end of bars 24 can also be connected together.

Ring 25 is connected, via a conductor 25, to one pole of a direct current source 28, while the gas permeable wall 9 is connected via a conductor 27 to the other pole of the same direct current source. In addition, the conductor 27 has an earth or ground connection 29.

During the process of cleaning the crude gas, the crude gas flows through the filter bed 2 in the direction of the arrows and the major part of the dust entrained in the crude gas deposits in the filter bed 2. This deposition of the dust is promoted by the array of electrostatically charged bars 24. In particular, bars 24 increase the tendency of the fine dust to agglomerate. Therefore, more dust is precipitated both on the bars 24 and in the filter bed 2.

The arrangement according to FIG. 2 can be modified without departing from the principles set forth in the present invention. For example, both the wall 9 and the wall 10 could be connected to the conductor 27 in FIG. 2. Bars 24 could even be completely eliminated with both walls 9 and 10 connected to the two poles of the direct current source 28. However, one of the two walls has to be electrically insulated with respect to the adjoining parts. That portion of the wall which is at the high electrical potential has to be protected with respect to the joining wall parts by means of ring-shaped electrical insulators 56 (FIG. 1).

The direct current source 28 can be a rectifier connected, via a transformer, to the alternating current supply. The electrostatic charging is interrupted during the regeneration phase or mode during which scavenging gas flows through the filter bed.

It is well known that the distance d, see FIG. 2, between the metal bar 24 and the gas-permeable wall 9 must be sufficiently large so that, when the high electrical potential is applied, no spark over takes place. The distance between the metal bar 24 and the oppositely located gas-permeable wall 10 must correspondingly be equal to at least a dimension d. Due to the location of metal bars 24 inside bed 2, it is necessary to use a comparatively thick filter bed which leads, in the case of large systems, to an enormous mass of granular filter material.

In order to eliminate this disadvantage, a filter bed 30 is used. According to FIG. 3, the spacing of the two gas-permeable walls, marked 31 and 32, corresponds approximately to the distance d in FIG. 2. However, in contrast to the embodiment according to FIG. 2, one pole of a direct current source 33 is connected to one gas-permeable wall 31 while the other gas permeable wall 32 is grounded via the conductors 34 and 35. The distance required for the prevention of spark overs consequently corresponds to the distance d of FIG. 2. In this modified embodiment, a comparatively thin filter bed can be achieved so that the entire system can be built with a light weight structure which is comparatively inexpensive to manufacture.

Figure 4:
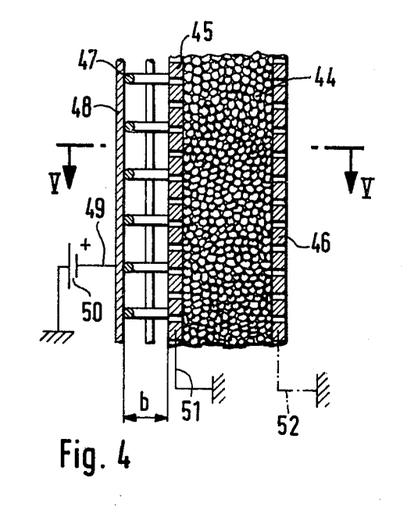
Figure 5:
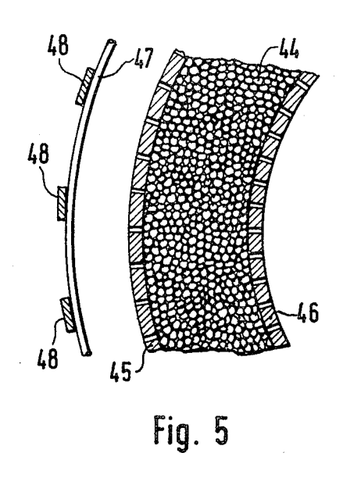
FIG. 5 is a sectional view along the line V—V in FIG. 4.

According to a further embodiment illustrated in FIG. 4 and 5, the filter bed 44 consisting of granular filter material is located between two gas-permeable walls 45 and 46. The sectional representation according to FIG. 4 is the modified section II in FIG. 1. In this embodiment, a lattice structure is located in the interspace b which extends outwardly from the gas permeable wall 45 and consists of horizontal rings 47 and vertical wires 48 which connect the superimposed rings 47 with one another. The lattice structure 47/48 is connected, via a conductor 49, to one pole of a direct current source 50 while the gas permeable wall 45 is grounded via another conductor 51.

Figure 6:
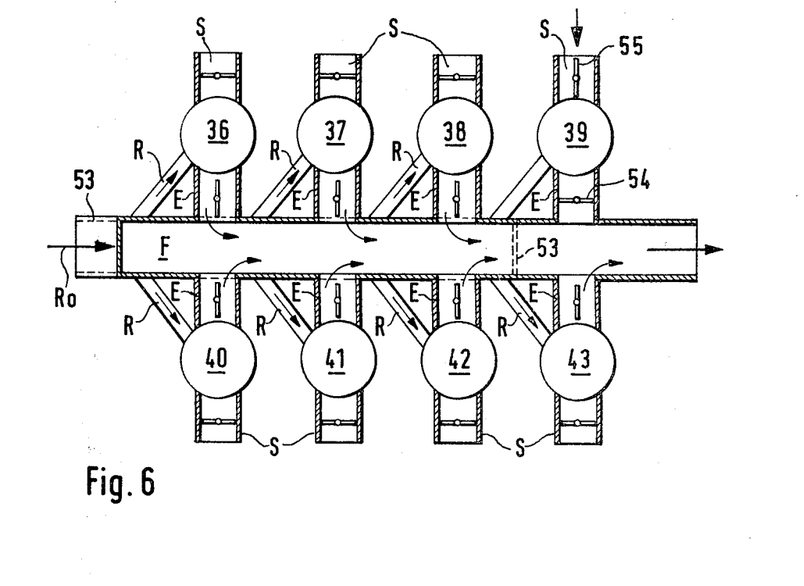
FIG. 6 is a diagrammatic sectional view of an assembly of a separate filter apparatus connected in parallel in accordance with the invention.

As shown in FIG. 6, a filter system in service in industry has a plurality of filter apparatus or devices 36 to 43 which are connected in parallel and through which the crude gas flows during gas cleaning operations. The dust laden crude gas flows through a crude gas duct 53, in the direction of the arrow R8, and then distributes itself through the ducts R which are connected to individual filter devices 36 to 43. After flowing through the filter devices 36 to 43, the clean gas flows through a clean gas outlet duct E and into a common clean gas collecting duct F. In FIG. 6, duct F is located above and largely masks the crude gas duct 53. The crude gas duct 53 consequently extends beneath the clean gas collecting duct F and terminates at the walls represented by broken lines.

It is also evident from FIG. 6, the scavening gas inlet ducts S of all the filter devices are closed, with the exception of the filter device 39. Thus, devices 36, 37, 38, 40 to 43 are switched to the crude gas-cleaning mode, while the device 39 is in a regenerating mode. For this reason, the shut-off flap valve 54 of the clean gas outlet duct E of the filter device 39 is also closed. The scavenging gas enters through the open flap valve 55. The system is automatically controlled in such a manner that, after a prescribed regeneration time, which is determined by the operating conditions, the flap valve 55 closes and the flap valve 54 reopens. Then the next filtering device, for example, the device marked 40, is simultaneously switched over from the crude gas-cleaning mode to the regenerating mode. In this manner, 100% gas throughput is continuously guaranteed.

Thus, control means is effective (1) for directing a flow of crude gas through the filter bed of the apparatus, (2) for interrupting the flow of the crude gas, (3) for introducing a flow of scavenging gas while the flow of crude gas is interrupted, and (4) for switching off the electrical potential while the flow of scavenging gas is being introduced. The regeneration frequency of the device can be selected such that the granular filter bed is always so clean that its electrical conductivity never takes place.

Figure 3:
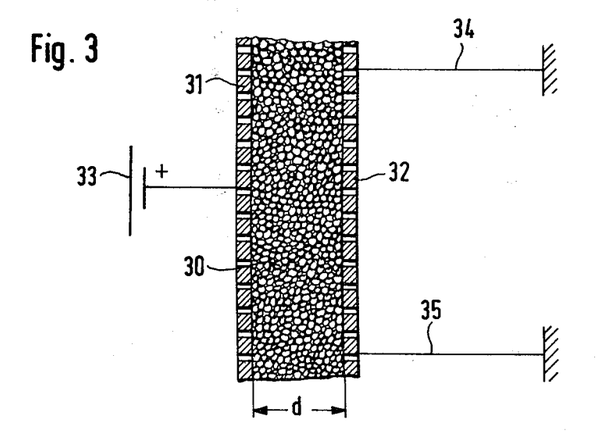
FIGS. 3 and 4 are fragmentary sectional views of modifications of the portion marked II in FIG. 1.

The tests, carried out with the system according to FIGS. 1 and 3, have now shown that when electrostatic charging by means of a high electrical potential is used, the smaller layer thickness d combined with a granular filter material having small grain size yields by far the better result. This view is different than the one previously held that a coarse particle, with an average diameter of approximately 10 mm, combined with a large filter layer thickness d of about 500 mm must produce the optimum degree of cleanness.

Figure 7:
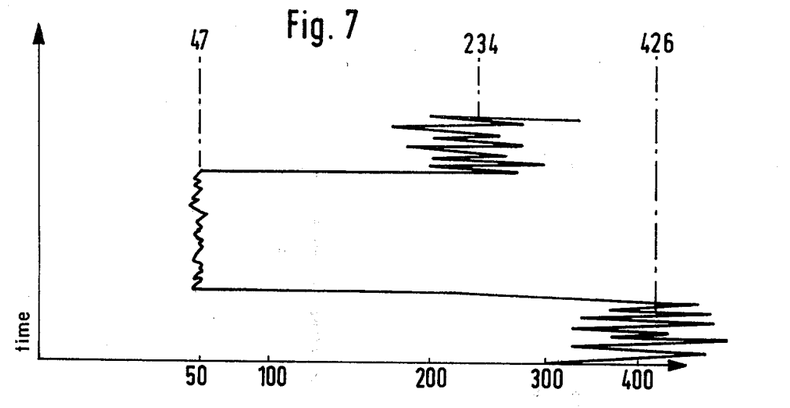
FIGS. 7, 8 and 9 are graphical representations of test results using the process and apparatus of this invention.
Figure 9:
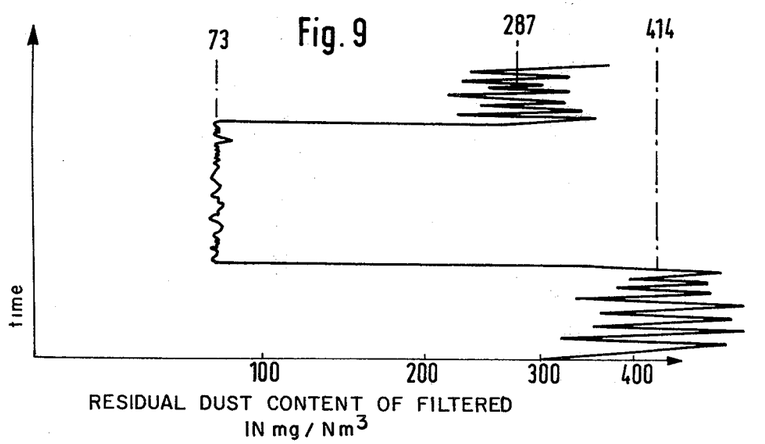

The result of comparative tests are graphically represented in FIGS. 7 and 9. In these figures, the ordinates represents the time and the abscissa represents the residual dust content of the clean gas. According to FIG. 7, the system having a gravel bed (quartz sand) of d=50 mm layer thickness and an average grain size of 4 mm was first operated without the high electrical potential. Under the above conditions an average residual dust content of 425 mg/Nm$^3$ was established. When switched to the high electrical potential, the gas-permeable wall on the clean gas side, the residual dust content of 47 mg/Nm$^3$ has immediately resulted. In this test, the direct current high electrical potential was approximately 38,000 volts. On reducing the high electrical potential to approximately 10,000 volts, the residual dust content in the clean gas again rose, as FIG. 7 shows, to an average value of 234 mg/Nm$^3$.

Figure 8:
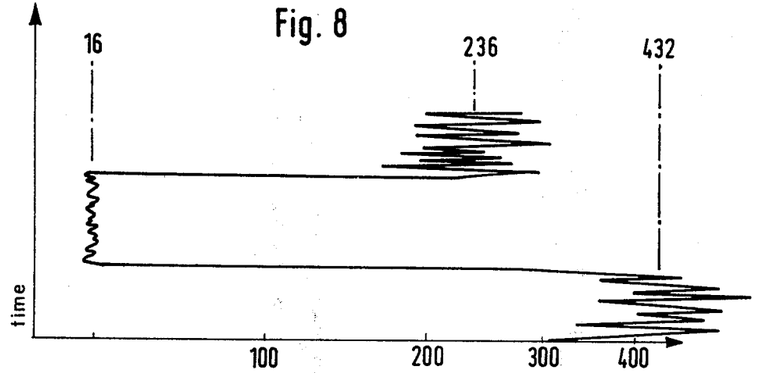

FIG. 8 shows the result obtained from a test arrangement in which a finer quartz sand having an average grain diameter of 2 mm was used. In this case, with the same layer thickness d of the filter bed, the picture represented in FIG. 8 showed interesting results. While the average residual dust content, without high electrical potential, was roughly unchanged at 432 mg/Nm$^3$, a residual dust content of only 16 mg/Nm$^3$ has resulted immediately after applying the high electrical potential to the gas-permeable wall on the clean gas side. The use of the finger-grained quartz sand on its own, consequently yielded no improvement. However, the combination of finer grain quartz sand and high electrical potential yielded a significant improvement.

Finally, the graph of FIG. 9 shows the results obtained from a test arrangement in which a gravel bed having a layer thickness of 100 mm and an average grain size diameter of 4 mm was used. In this case, the residual dust content of the clean gas before the application of the high electrical potential, was approximately the same as in the two preceding tests, 414 mg/Nm$^3$ as an average value. After applying a high electrical potential of 40,000 volts, a residual dust content of approximately 73 mg/Nm$^3$ was established. This residual dust content rose to 287 mg/Nm$^3$ in the case of a high electrical potential of only 10,000 volts.

These tests now show, convincingly, that the smaller layer thicknesses of the filter bed and the finer-grained bed material prove more satisfactory in combination with a high electrical potential than the large layer thicknesses and coarse-grained material of the prior art. The conclusion within the scope of the present invention is that the combination of a filter-bed thickness between 25 and 100 mm with an average grain diameter of the granular filter material of 0.5 to 2.0 mm and a direct current high electrical potential of between 10,000 and 60,000 volts, preferably 40,000 volts, applied in the filter bed produces an optimum residual dust content of the clean gas. The present results having been unobtainable with the systems known hitherto.

The amazing improvement by using the finer-grain material can be explained in the following manner: At no point in time during the operation of the filter device is the comparatively thick and coarse-grained filter bed of the known system completely clean. Instead these continuously moving beds exhibit a degree of contamination which progressively increases from top to bottom. The advantage of applying the electrostatic, high electrical potential charge to the filter bed is rendered ineffective because of the contamination of the known filter bed. That is, contamination of the filter bed causes the filter bed to become electrically conductive. Consequently, an appreciable current continues to flow through the filter bed of the known system thereby increasing the consumption of energy and reducing the efficiency of the crude gas cleaning process.

In the process according to the invention, the entire filter bed is completely replaced in each regeneration phase over the entire filter bed height by a cleaned, filter material having excellent electrical insulation properties. By simultaneously using a plurality of apparatus connected in parallel, and by continuously regenerating at least one of these apparatus, the regeneration frequency can be selected such that a current flow through the filter bed, is virtually eliminated and the degree of cleaning is maintained at the optimum value.

Furthermore, by using a fine grain material, the filter bed is contaminated by the dust laden crude gas only on its edge layer on the crude gas side. The remainder of the filter layer thickness remains virtually dust free during a crude gas cleaning period. Consequently, the bed retains the desired electrical insulating properties to operate the filter device with high electrical potential from about 40,000 to 60,000 volts. This advantage, whereby only the edge layer on the crude gas side is contaminated with dust, cannot be achieved in the coarse grain filter beds since, the dust penetrates comparatively deeply into the filter bed from the beginning and renders the filter bed at least partially conducting during the entire operating time.

If, for example, eight (8) filter devices are arranged in a system as shown in FIG. 6, and an assumed operating time of 40 minutes provides a regeneration time of 5 minutes for the successive cleaning of each individual filter device 36 to 43. Since, the layer thickness d, (in FIG. 3), can be kept small, the comparatively small mass of granular filter material can be circulated at least once during this time without any difficulty. In the case of a preferred embodiment, the layer thickness d of the filter bed, represented in FIG. 3, is approximately 50 mm. This results in a quantity of granular filter material of approximately 30 kg per unit.

In contrast to the large systems which contain the granular filter material of 150 tons, a row of smaller systems can be employed in accordance with the present invention, which has a comparatively smaller filter bed mass of approximately 0.3 tons. At all times, with a total of n systems, n−1 systems are in operation at any given time. Both the gas throughput and the degree of cleaning are kept constant at 100%. A skilled artisan can modify the examples illustrated without departing from the principles set forth in the present invention. For example, it would be possible to select gas-permeable wall 45 of the FIGS. 4 and 5 from a material which does not conduct electricity and ground the inner wall 46, via line 52, which is located opposite the lattice structure 47/48.

While the dust laden gas cleaning process and apparatus has been shown and described in detail, it is obvious that this invention is not to be considered as being limited to the exact form disclosed, and that changes in detail and construction may be made therein within the scope of the invention, without departing from the spirit thereof.

I claim:

1. A process for the intermittent cleaning of dust laden crude gases, said process comprising the steps of:
   (a) providing a vertically disposed filter bed unit within a gas-tight housing and including means for retaining filter material to form a stationary filter bed of granular, electrically insulating filter material located between two gas-permeable walls which are spaced apart from one another, (b) the filter bed has a layer thickness d of between 25 and 100 mm and the granular filter material has an average grain size of between 0.5 and 2 mm, (c) applying an electrical potential of between 38,000 and 60,000 volts in the region of the stationary filter bed while introducing dust laden crude gases through the filter material which remains stationary in the filter bed during a crude gas cleaning mode, and then (d) switching off said electrical potential and circulating the granular filter material within the filter bed unit during a regenerating mode to completely clean the filter material within said filter bed unit.

2. A process as defined in claim 1 wherein there are a plurality of vertically disposed filter bed units provided which are connected in parallel with respect to each other, at any given time, maintaining at least one filter bed unit in said regenerating mode while the remaining filter bed units are operating in said crude gas cleaning mode thereby maintaining an optimum cleaning potential throughout the overall plurality of filter beds.

3. A process as defined in claim 1 wherein the filter bed has an annular cross section disposed between two concentrically disposed gas-permeable walls and a vertically disposed central conveying pipe is provided within the concentrically located gas-permeable walls, scavenging gas is intermittently directed upwardly through the central conveying pipe in a direction opposite to the flow direction of the crude gas and through the filter bed during said regenerating mode.

4. A process as defined in claim 3 wherein the high potential is applied between the two gas-permeable walls.

5. A process as defined in claim 3 wherein the high potential is applied between one of said walls and at least one conducting element provided at a spaced distance from said wall to which the high potential is applied.

6. A process as defined in any one of claims 3, 4 or 5 wherein the electrical potential has a charge of about 40,000 volts.

7. In a process for the intermittent cleaning of dust laden crude gases, said process comprising the steps of:

(a) applying an electrical potential of between 38,000 and 60,000 volts in the region of a filter bed unit to a filter bed of granular filter material which has an average grain size of between 0.5 and 2 mm and a layer thickness d of between 25 and 100 mm while introducing dust laden crude gases through the filter material which remains stationary in the filter bed during a crude gas cleaning mode, and then (b) switching off said electrical potential and circulating the granular filter material within the filter bed unit during a regenerating mode to completely clean the filter material within said filter bed unit.

8. A process as defined in claim 7 wherein there are a plurality of filter bed units provided which are connected in parallel with respect to each other, at any given time, maintaining at least one filter bed unit in said regenerating mode while the remaining filter bed units are operating in said crude gas cleaning mode thereby maintaining an optimum cleaning potential throughout the overall plurality of filter beds.

9. A process as defined in claim 7 wherein the filter bed unit is disposed within a gas-tight housing, the filter bed has an annular cross section disposed between two concentrically located gas-permeable walls and a vertically disposed central conveying pipe is disposed within the concentrically located gas-permeable walls, scavenging gas is intermittently directed upwardly through the central conveying pipe in a direction opposite to the flow direction of the crude gas and through the filter bed during said regenerating mode.

10. A process as defined in claim 9 wherein the high potential is applied between one of said walls and at least one conducting element located at a spaced distance from said wall to which the high potential is applied.

11. A process as defined in either one of claims 9 or 10 wherein the electrical potential has a charge of about 40,000 volts.

12. An apparatus for intermittently cleaning dust laden crude gases by a combination of an electrical potential charge and a filter bed composed of granular filter material, said apparatus comprising:

(a) a vertically disposed gas-tight housing having an inlet for directing dust laden crude gases into a crude gas region and an outlet for discharging clean gas from a clean gas region, (b) two vertically disposed, gas-permeable walls laterally spaced a distance of about 25 to 100 mm with respect to each other within the gas-tight housing, (c) a granular filter material having an average grain size of 0.5 to 2 mm is disposed within the spacing, (d) means for retaining the filter material to form a stationary filter bed, the spacing between the two spaced gas-permeable walls being effective to contain said stationary filter bed consisting of granular, electrically insulating filter material, (e) gas conveying means mounted to said gas-tight housing for intermittently directing cleaning gas through the housing to regenerate the granular filter material while the filter material remains within the housing, (f) discharging means for directing dust particles cleaned from the dust laden crude gases out of the gas-tight housing, and (g) means for intermittently applying an electrical potential of about 38,000 to 60,000 volts to the region of the stationary filter bed.

13. An apparatus as defined in claim 12 wherein said two spaced gas-permeable walls includes a cylindrical section and a conical section which are vertically disposed concentric, and the spacing within the cylindrical section has an annular cross-section and the conical section includes a pair of cone members each connected to one end of the two spaced gas-permeable walls of the cylindrical section, said gas conveying means includes a conveyor pipe mounted within said clean gas region and in fluid communication with said pair of cone members.

14. An apparatus as defined in claim 13 wherein
said electrical potential applying means includes conductor means connected to one of said two spaced gas-permeable walls for directing electrical current thereto, and means for grounding the remaining wall of the two spaced gas-permeable walls to apply a high electrical potential to the filter bed.

15. An apparatus as defined in claim 13 wherein
said electrical potential applying means includes a plurality of spaced electrically conducting bars inserted in said filter bed, ring means joining at least one end of said bars to each other, conductor means connected to said ring means at least one of said two spaced gas-permeable walls to apply a high electrical potential to the filter bed.

16. An apparatus as defined in either claim 14 or 15 wherein
a plurality of insulating rings are mounted between said cone members and either one of the two spaced gas-permeable walls in the cylindrical section.

17. An apparatus as defined in claim 15 wherein
said bars are spaced from the two spaced gas-permeable walls by a distance effective to prevent any spark over.

18. An apparatus as defined in claim 13 wherein
said electrical potential applying means includes an electrically conductive lattice structure mounted in said crude gas region, conductor means connected to said electrically conductive lattice structure and to at least one of said two spaced gas-permeable walls to apply an electrical potential in the region of the filter bed.

19. An apparatus as defined in claim 18 wherein
said electrically conductive lattice structure includes a plurality of wires which join a plurality of rings disposed outside the spaced permeable walls.

20. An assembly of a plurality of apparatus as defined in claim 12 wherein
each said apparatus is connected in parallel relationship with respect to the next apparatus,
control means for each said apparatus is effective for directing a flow of crude gas through the filter bed of each apparatus independently from the other apparatuses for interrupting the flow of crude gas, for introducing a flow of scavenging gas while the flow of crude gas is interrupted, and for switching off the electrical potential while the flow of scavenging gas is being introduced,
means for circulating the granular filter material in at least one of the plurality of apparatus at any given time to effect regeneration while the electrical potential is switched off,
said control means and circulating means being effective to renew, periodically, the granular filter material in its entirety in said at least one of the plurality of apparatus while the granular filter material in the remaining apparatus remains undisturbed.

21. An assembly as defined in claim 20 wherein
the electrical potential applying means electrically connects said gas-permeable walls with respect to each other for the purpose of reducing thickness (d) of the filter bed thereby reducing the mass of the filter material.

22. An assembly as defined in claim 20 wherein one of the gas-permeable walls is connected to ground and the other wall is connected to one pole of a direct current source.

23. An assembly as defined in claim 20 wherein
an electrically conducting grating structure is located outside the cylindrical section of the permeable walls,
the electrical potential applying means electrically connects one of the gas-permeable walls to the grating structure.

24. An assembly as defined in claim 23 wherein
the grating structure is a metal plate with punched perforations or a metallic woven mesh screen.

25. An assembly as defined in claim 23 wherein
said cylindrical section of the gas-permeable wall is either electrically connected to ground or to a high electrical potential,
a ring-shaped insulator means is disposed around the entire periphery of the cylindrical section at the location of the joint between said cylindrical section and any adjoining parts thereto.

26. An apparatus for intermittently cleaning dust laden crude gases by a combination of an electrical potential charge and a filter bed composed of granular filter material, said apparatus comprising:
(a) a vertically disposed, gas-tight housing having an inlet for directing dust laden crude gases into a crude gas region and an outlet for discharging clean gas from a clean gas region,
(b) two vertically-disposed, gas-permeable walls laterally spaced a distance with respect to each other within the gas-tight housing,
(c) means for retaining the filter material to form a stationary filter bed, the spacing between the two spaced gas-permeable walls being effective to contain said stationary filter bed, which has a layer thickness d of between 25 to 100 mm and consisting of electrically insulating, granular filter material, which has an average grain size of between 0.5 to 2 mm,
(d) gas conveying means mounted to said gas-tight housing for intermittently directing cleaning gas through the housing to regenerate the granular filter material while the filter material remains within the housing,
(e) discharging means for directing dust particles cleaned from the dust laden crude gases out of the gas-tight housing, and
(f) means for intermittently applying an electrical potential of about 38,000 to 60,000 volts to the region of the stationary filter bed.

27. An apparatus as defined in claim 26 wherein
said two spaced gas-permeable walls includes a cylindrical section and a conical section which are concentric,
the spacing within the cylindrical section has an annular cross-section and the conical section includes a pair of cone members each connected to one end of the two spaced gas-permeable walls of the cylindrical section,
said gas conveying means includes a conveyor pipe mounted within said clean gas region and in fluid communication with said pair of cone members.

28. An apparatus as defined in claim 27 wherein
said electrical potential applying means includes conductor means connected to one of said two spaced gas-permeable walls for directing electrical current thereto and means for grounding the remaining wall of the two spaced gas-permeable walls to apply to a high electrical potential to the filter bed.

29. An apparatus as defined in claim 27 wherein
said electrical potential applying means includes a plurality of spaced electrically conducting bars inserted in said filter bed, ring means joining at least one end of said bars to each other, conductor means connected to said ring means and to at least one of said two spaced gas-permeable walls to apply a high electrical potential to the filter bed.

30. An apparatus as defined in either claim 28 or 29 wherein
a plurality of insulating rings are mounted between said cone members and either one on the two spaced gas-permeable walls in the cylindrical section.

31. An apparatus as defined in claim 29 wherein
said bars are spaced from the two spaced gas-permeable walls by a distance effective to prevent any spark over.

* * * * *